(12) United States Patent
Satoyama et al.

(10) Patent No.: US 6,976,140 B2
(45) Date of Patent: Dec. 13, 2005

(54) COMPUTER SYSTEM AND A METHOD OF REPLICATION

(75) Inventors: Ai Satoyama, Sagamihara (JP); Yasutomo Yamamoto, Sagamihara (JP); Takashi Oeda, Sagamihara (JP); Kouji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 10/218,071

(22) Filed: Aug. 14, 2002

(65) Prior Publication Data

US 2003/0221074 A1 Nov. 27, 2003

(30) Foreign Application Priority Data

May 24, 2002 (JP) ........................................ 2002-149970

(51) Int. Cl.$^7$ ............................................. G06F 12/00
(52) U.S. Cl. ........................ 711/161; 711/162; 711/1; 711/4; 711/100; 711/111; 711/112; 711/114; 711/147; 711/148; 711/149; 711/141; 714/5; 714/6
(58) Field of Search ................. 711/147–149, 161–162, 711/114, 1, 4, 100, 111, 112, 141, 202.703; 714/5–6

(56) References Cited

U.S. PATENT DOCUMENTS

| | | | | |
|---|---|---|---|---|
| 4,276,594 A | * | 6/1981 | Morley ........................ | 713/600 |
| 5,051,887 A | * | 9/1991 | Berger et al. ................ | 711/162 |
| 6,173,293 B1 | * | 1/2001 | Thekkath et al. ........... | 707/201 |
| 6,353,878 B1 | * | 3/2002 | Dunham ...................... | 711/162 |
| 6,434,681 B1 | * | 8/2002 | Armangau ................... | 711/162 |
| 6,587,931 B1 | * | 7/2003 | Bauman et al. ............. | 711/145 |
| 6,611,850 B1 | * | 8/2003 | Shen ........................... | 707/204 |
| 6,625,704 B2 | * | 9/2003 | Winokur ..................... | 711/162 |
| 6,694,413 B1 | * | 2/2004 | Mimatsu et al. ............ | 711/162 |

FOREIGN PATENT DOCUMENTS

JP    2001-318833    11/2001

* cited by examiner

*Primary Examiner*—Matthew Kim
*Assistant Examiner*—Zhuo H. Li
(74) *Attorney, Agent, or Firm*—Mattingly, Stanger, Malur & Brundidge, P.C.

(57) ABSTRACT

In a cluster-structured disk subsystem, when creating a volume for an online backup separately from a volume for a normal I/O, it is desirable to be able to achieve such a creation for any volume under subsystem. Further, with an increase in the capacity of the subsystem, it becomes more difficult for a user to determine where to place a volume to which data is to be copied. Thus, a cluster-structured storage system is provided in which it is possible to reference/renew snapshot control information in shared memory of other clusters and achieve a snapshot between clusters via an inter-cluster connecting mechanism. In this system, control is performed inside/outside the cluster, and a control is performed inside/outside the cluster, and a volume to which data is to be copied is suggested to the user.

10 Claims, 11 Drawing Sheets

| volume # | primary/ secondary | secondary volume | | volume attributes |
|---|---|---|---|---|
| | | volume # | cluster # | |
| 0 | true | #20 | #1 | |
| | true | #158 | #1 | |
| | true | #426 | #1 | |
| ⋮ | | | | |
| N | | | | |

FIG.10 original volume information 92

| cluster number | volume number |
|---|---|
| 1 | 293 | display mode 93
● list
○ view unassigned volume
- in the case of same cluster 94

| cluster # | volume # | volume type # | capacity |
|---|---|---|---|
| 1 | 13 | A | 100 |
| 1 | 50 | A | 120 |
| ... | | | |

FIG.11

COMPUTER SYSTEM AND A METHOD OF REPLICATION

BACKGROUND OF THE INVENTION

The present invention relates to a method of effecting replication of data in a computer system.

In recent years, there has been demands for shortening the time which is required to make a copy of data stored in a storage owned by a corporation (hereafter, called a "backup") and to store this backup copy in another storage. This is because, while the time required for backups is ever increasing in accordance with an increase in the amount of information owned by the corporation, the actual time assigned for such backups is being shortened due to the longer service hours of the corporation.

As a technique used to backup data stored in a storage without interrupting the daily operation of the corporation, a procedure called a snapshot has been proposed. A snapshot is a function in which a copy is made of the contents of a storage area in the storage at a particular moment without using a computer connected to the storage. With this function, the user uses an original storage area for business use and uses data stored in the copied storage area for a backup.

As a technique to enhance the scalability of a storage connected to a network, a cluster-structured storage system can be used. The cluster-structured storage system is based on a technique in which a conventional storage system, such as a disk array device, is regarded as one cluster, and a single storage system is constructed of a plurality of clusters.

So far, there are no documents in which execution of a snapshot in a cluster-structured storage system is suggested. Further, a simple combination of a cluster-structured storage system and a conventional snapshot technique merely results in a technique for copying storage areas within one cluster.

However, when copies of storage areas cannot be made between different clusters, there will exist a storage area to which another storage area can be copied and a storage area to which another storage area cannot be copied in one cluster-structured storage system, thereby ruining the scalability, which is the primary object of the cluster-structured storage system.

Further, if there are both a storage area from which data is copied and a storage area to which data is copied in the same cluster, the performance of such a cluster will not be improved. For example, when a storage area to which data is to be copied is created in the same cluster, an I/O of the operation is performed in the storage area from which data is copied and an online backup is made from the storage area to which data is copied, the cache memory contained in one cluster is shared by both the operation and the backup. Thus, the backup disturbs the normal I/O operation, which results in a delay in the operation. Further, if loads are concentrated on a particular cluster, the overall performance will also be deteriorated.

SUMMARY OF THE INVENTION

An object of the present invention is to provide a cluster-structured storage system in which a copy of the contents of a storage area can be made freely without concern for clusters.

Further, in a cluster-structured storage system in which a copy of the contents of a storage area can be made freely without concern for clusters, a user may be at a loss as to where to reserve a storage area to which data is to be copied. Thus, a second object of the present invention is to help the user determine a storage area to which data is to be copied.

In order to solve the above problems, in one preferred embodiment of the present invention, there is provided a means to achieve a snapshot between clusters in a cluster-structured storage system. To be more specific, the present invention makes it possible to reference information, such as unassigned volumes of the cluster stored in the memory of each cluster, so that each cluster can acquire information such as unassigned volumes of other clusters.

Further, when the user determines a volume to which a snapshot is to be copied, there is provided a means to suggest which volume to select using a computer connected to the cluster-structured storage system.

Also, in an alternative embodiment of the present invention, when the cluster-structured storage system executes a snapshot, the computer connected to the cluster-structured storage system recognizes in which cluster a volume from which data is to be copied exists. Further, a means is provided to suggest to the user that, of all the unassigned volumes in the disk subsystem, a volume in a cluster, that is different from the cluster which includes the volume from which data is to be copied, should be used as a volume to which data is to be copied.

Also, to avoid a biased backup load between clusters, a means is provided in which a computer connected to the cluster-structured storage system refers to the monitored result of the load in the disk subsystem; and, based on the monitored result of the load, a volume to which data is to be copied is proposed.

Other and further objects, features and advantages of the invention will appear more fully from the following description.

DESCRIPTION OF THE PREFERRED EMBODIMENTS

Figure 1:
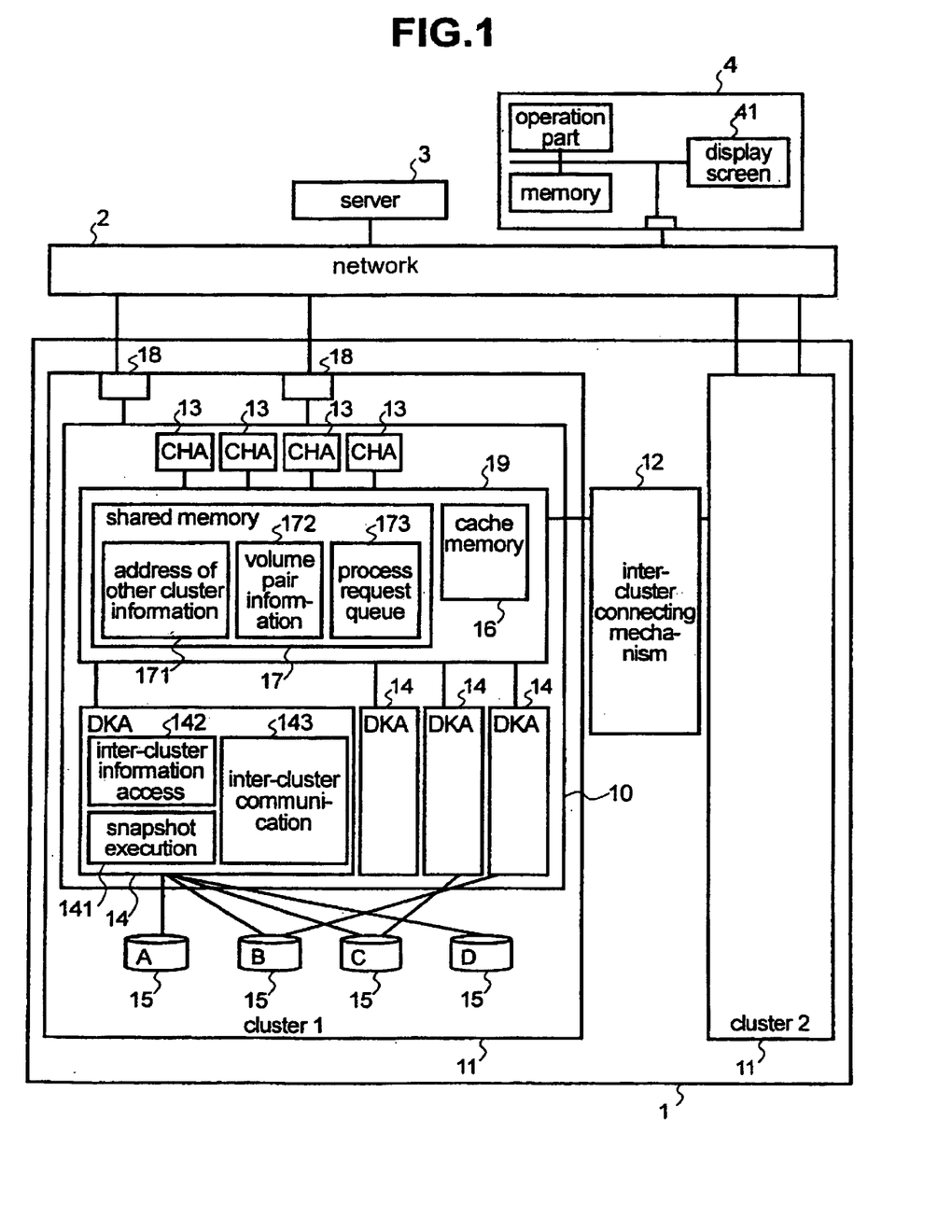
FIG. 1 is a block diagram showing an embodiment of a computer system of the present invention.

FIG. 1 is a block diagram showing an embodiment of a computer system in accordance with the present invention.

The computer system comprises a cluster-structured storage system 1, a computer (hereafter called a "server") 3 using data stored in the cluster-structured storage system 1, and a computer (hereafter called a "user input device") 4 for controlling the cluster-structured storage system 1. Also, these devices are connected to each other via a network 2.

The cluster-structured storage system 1 comprises a plurality of clusters 11 and an inter-cluster connecting mechanism 12 connecting the clusters 11. In particular, the inter-cluster connecting mechanism 12 may be a switch or a communication line.

Each cluster 11 comprises a control section 10, a plurality of disk units 15, and a network interface 18. Each cluster 11 is connected to the server 3, which is its host computer, and to the user input device 4 via the network 2 and the network interface 18.

The control section 10 comprises a memory unit 19, a plurality of CHAs (Channel Adapters) 13, and a plurality of DKAs (Disk Adapters) 14. The CHAs 13 and the DKAs 14 are processors mounted in the control section 10. A CHA 13 conducts an analysis of commands inputted from the server 3 to the cluster 11 via the network interface 18, and it executes a program for transferring data between the server 3 and the cluster 11. Also, it is possible for a single processor to serve as both a CHA and a DKA. In this case, the design will be easier compared to the case of a structure using a plurality of processors.

When the cluster-structured storage system 1 corresponds to the server 3, in which an operating system of a so-called open system type is put into effect, as hardware and a program related to the interface 18 that is disposed between the server 3 and the cluster-structured storage system 1, one that corresponds to the operating system of the open system type is adopted.

A DKA 14 carries out control of a disk array, such as generating parity, and executes a program to control the transfer of data between the disk unit 15 and the control section 10. Each disk unit 15 has a plurality of ports and is connected to different DKAs 14 via a plurality of paths. Therefore, a disk unit 15 can be accessed from any DKA 14.

The memory unit 19 comprises shared memory 17 and cache memory 16, which can be accessed from various processors, such as a CHA and a DKA. Those processors store data, which should be shared among them such as information necessary for job management and information for controlling the cache memory, in the shared memory 17.

The shared memory 17 stores volume pair information 172, to be used when executing a snapshot, a process request queue 173, and an other cluster information-storing position table 171, which is information necessary during the interaction between clusters. The term "pair" refers to a set of storage areas, including a storage area from which data is to be copied (hereafter called an "original volume") and a storage area to which data is to be copied (hereafter called a "target volume").

The DKA 14 has, in its memory, a snapshot execution program 141, which is a program for executing a snapshot, an inter-cluster information access program 142, which is a program for accessing information between clusters, and an inter-cluster communication program 143, which is a program for communication between clusters.

The user input device 4 is a device to be used by the user of the cluster-structured storage system 1 to indicate a target volume to the cluster-structured storage system 1 when the user instructs the cluster-structured storage system 1 to execute a snapshot. To be more specific, it is a service terminal, such as a SVP. The user input device 4 comprises an operation part, a memory, an interface with the network, and a display screen 41. The operation part of the user input device 4 executes a program stored in the memory, and it presents candidate target volumes to a user on the display screen 41 to visually support the user in the selection of a target volume. Also, the server 3 and the user input device 4 may be the same computer.

Figure 2:
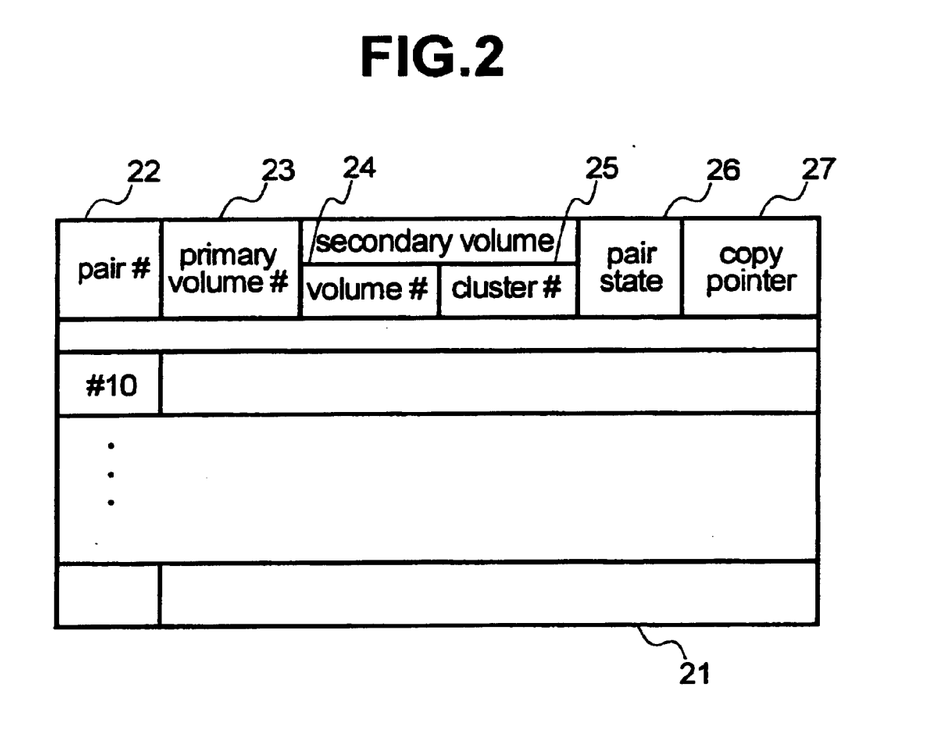
FIG. 2 is a diagram which shows an example of a pair information table.
Figure 3:
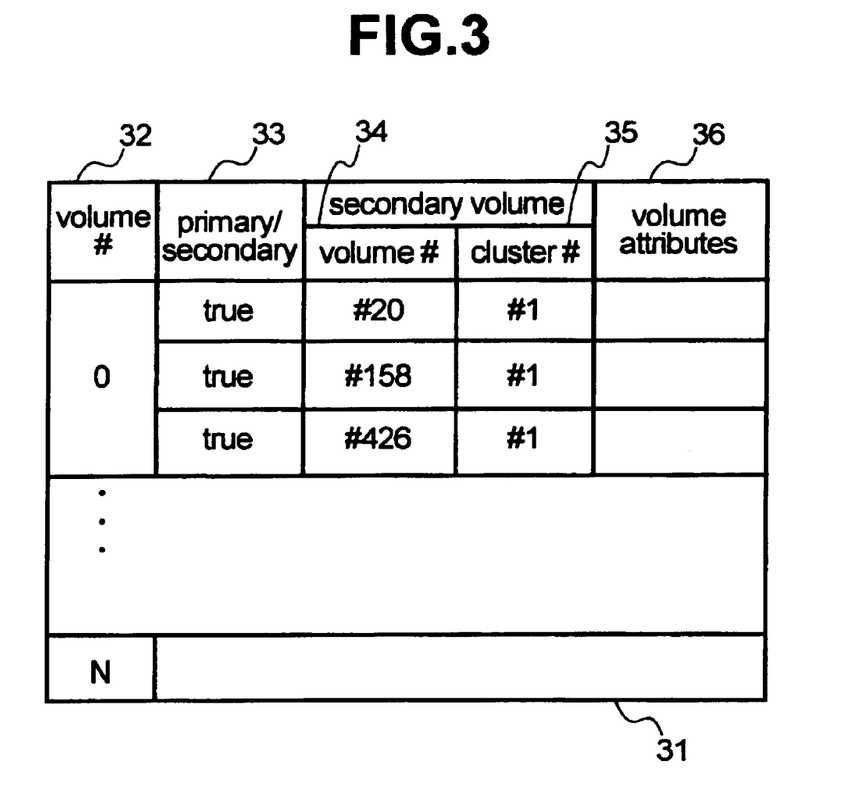
FIG. 3 is a diagram which shows an example of a volume information table.

FIGS. 2 and 3 show the configuration of volume pair information 172 to be stored in the shared memory 17. The volume pair information 172 comprises a pair information table 21 and a volume information table 31. Hereafter, an original volume is called a "primary volume" and a target volume is called a "secondary volume."

The pair information table 21 contains a pair number entry 22, a primary volume number entry 23, a secondary volume volume number entry 24, a secondary volume cluster number entry 25, a pair state entry 26, and a copy pointer entry 27.

Information to show a pair consisting of a primary volume and a secondary volume, namely, a pair number, is registered in the pair number entry 22. Information to show a primary volume, constituting a corresponding pair, is registered in the primary volume number entry 23. Information to show numbers of a cluster to control the secondary volume and the volumes are registered in the secondary volume volume number entry 24 and the secondary volume cluster number entry 25, respectively.

In the pair state entry 26, information is registered to show whether the corresponding pair is being copied or has been copied. In the copy pointer entry 27, information is registered to show how far the primary volume of the corresponding pair has been copied.

In the volume information table 31, information to be used for a snapshot is registered. The volume information table 31 contains a volume number entry 32, a primary/secondary entry 33, a secondary volume volume number entry 34, a secondary volume cluster number entry 35, and a volume attributes entry 36.

In the volume number entry 31, information is registered to specify a storage area (hereafter called a "volume") contained in the cluster-structured storage system 1. In the primary/secondary entry 33, information is registered to show whether a corresponding volume is a primary volume or a secondary volume. When the corresponding volume is a primary volume, information on the secondary volume constituting the pair is registered in the secondary volume volume number entry 34 and the secondary volume cluster number entry 35. In the volume attributes entry 36, information is registered to show whether the corresponding volume can be set as a target volume of the snapshot.

As an example, FIG. 3 shows a case in which three pairs are produced with respect to a volume whose volume number is "0." The counterparts of the volume whose volume number is "0" are defined as volume Nos. 20, 158, and 426 of the cluster No. 1.

In order to achieve a snapshot between clusters, every cluster 11 has a pair of tables, including an information table 21 and a volume information table 31, stored as volume pair information 172 in the shared memory 171 thereof. The volume information table 31 of a cluster 11 has the information of all of the volumes contained in the cluster 11. On the other hand, in the pair information table 21 of a cluster 11, only the information of a pair related to the cluster 11 is registered. Therefore, the information of pairs that the whole cluster-structured storage system 1 includes is distributed to and held by each cluster. For example, in a cluster 11, in which a primary volume of a snapshot is physically stored, pair information corresponding to the stored primary volume is stored.

Figure 4:
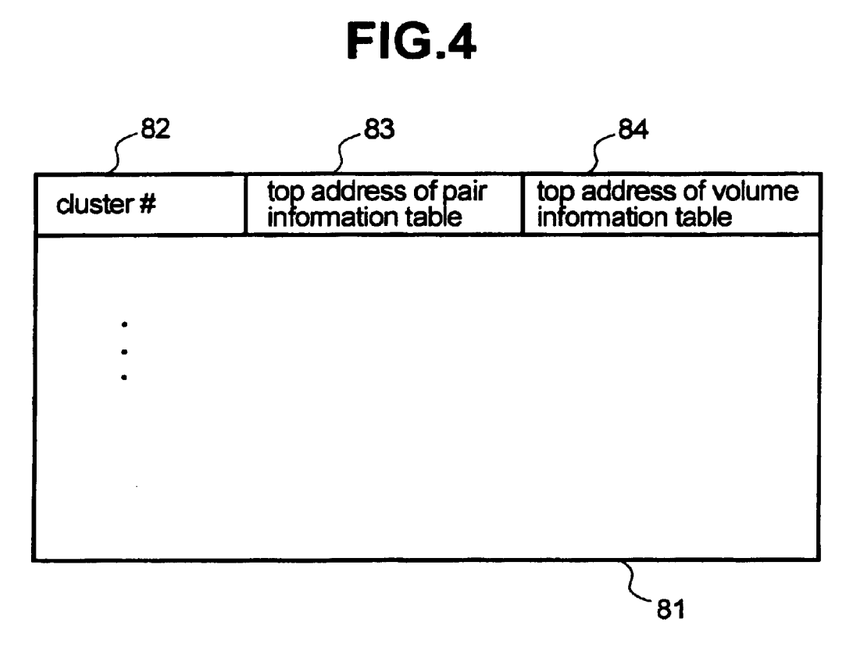
FIG. 4 is a diagram which shows a listing table for pair information table storing addresses of other clusters.

FIG. 4 shows the contents of the other cluster information-storing position table 171 that is stored in the shared memory 17.

In accordance with the present invention, the memory space of the shared memory 17 contained in each cluster 11 is treated virtually as one memory space. In this case, the memory space of each cluster 11 may be sequentially allocated to a single virtual memory space, or it may be allocated independently.

The cluster information-storing position table 171 contains a cluster number entry 82, a top address entry 83 of the pair information table 21, and a top address entry 84 of the volume information table 31. In the entry 82, cluster numbers to specify clusters are registered.

In the entry 83, a top address is registered to indicate a storing position of the pair information table 21 in the memory space of the virtual shared memory. In the entry 84, a top address is registered which contains a storing position of the volume information table 31 in the memory space of the virtual shared memory.

When executing a snapshot between clusters, the DKA 14 has to reference/renew snapshot information (the information stored in the pair information table 21 and the volume information table 31) of other clusters. In this case, according to a volume number indicating a volume to be accessed and a cluster number indicating a cluster 11 controlling the volume, the DKA 14 searches the other cluster information-storing position table 171, and calculates a position at which information on the corresponding volume is registered.

For example, volume information on the volume of cluster No. 1 and volume No. 4 is stored in the shared memory 17 of a cluster 11, which corresponds to an address in the virtual shared memory space calculated by the following expression.

Top address for storing volume information table of cluster No. 1+Amount of information per volume×4.

As described above, by treating all of the shared memory 17 contained in the cluster-structured storage system 1 as virtually one memory space, it becomes possible for the DKA 14 to reference/renew snapshot information stored in the shared memory 17 of all the clusters 11 of the cluster-structured storage system 1.

Figure 5:
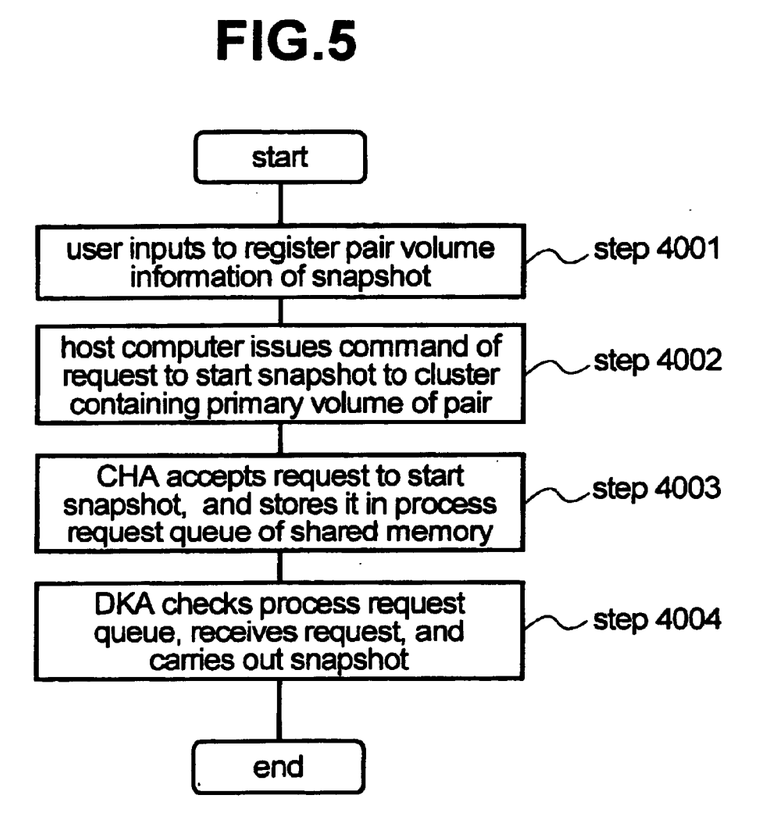
FIG. 5 is a flowchart showing a procedure for executing a snapshot.

FIG. 5 is a flowchart showing a procedure for executing a snapshot in the cluster-structured storage system 1.

First, with the user input device 4, a user selects an original volume and a target volume for the snapshot, regards the selected volumes as a copy pair, and specifies a corresponding pair number. The procedure, in detail, of the selection of the target volume will be described later (step 4001).

When the pair is specified, in order to allow the cluster-structured storage system 1 to execute the copying with respect to the specified pair, the server 3 gives the cluster-structured storage system 1 a command for requesting the start of a snapshot. This command is issued to a cluster 11 having a true volume of the determined pair (step 4002).

Upon receipt of the command from the server 3, a CHA 13 of the cluster 11 analyzes the command, creates a job that can be processed by a DKA 14, and registers it in a process request queue 173 of the shared memory 17 as a process request. The process request may be the same as that of a normal I/O, or it may be a request exclusively used for a snapshot (step 4003).

A DKA 14, which is not executing a job, examines the contents of the process request queue 173 at predetermined time intervals. When a request to indicate the unexecuted process is registered in the process request queue 173, the DKA 14 acquires the request indicating the process and executes a snapshot corresponding to that request. Further, when the specified true volume is already processing another snapshot, the DKA 14 waits until that processing is over, or it notifies the user of the situation. The DKA 14 examines contents of a pair state entry 26 corresponding to the specified primary volume, and checks to determine if another snapshot is being processed (step 4004).

Now, the snapshot processing in step 4004 will be described.

Figure 6:
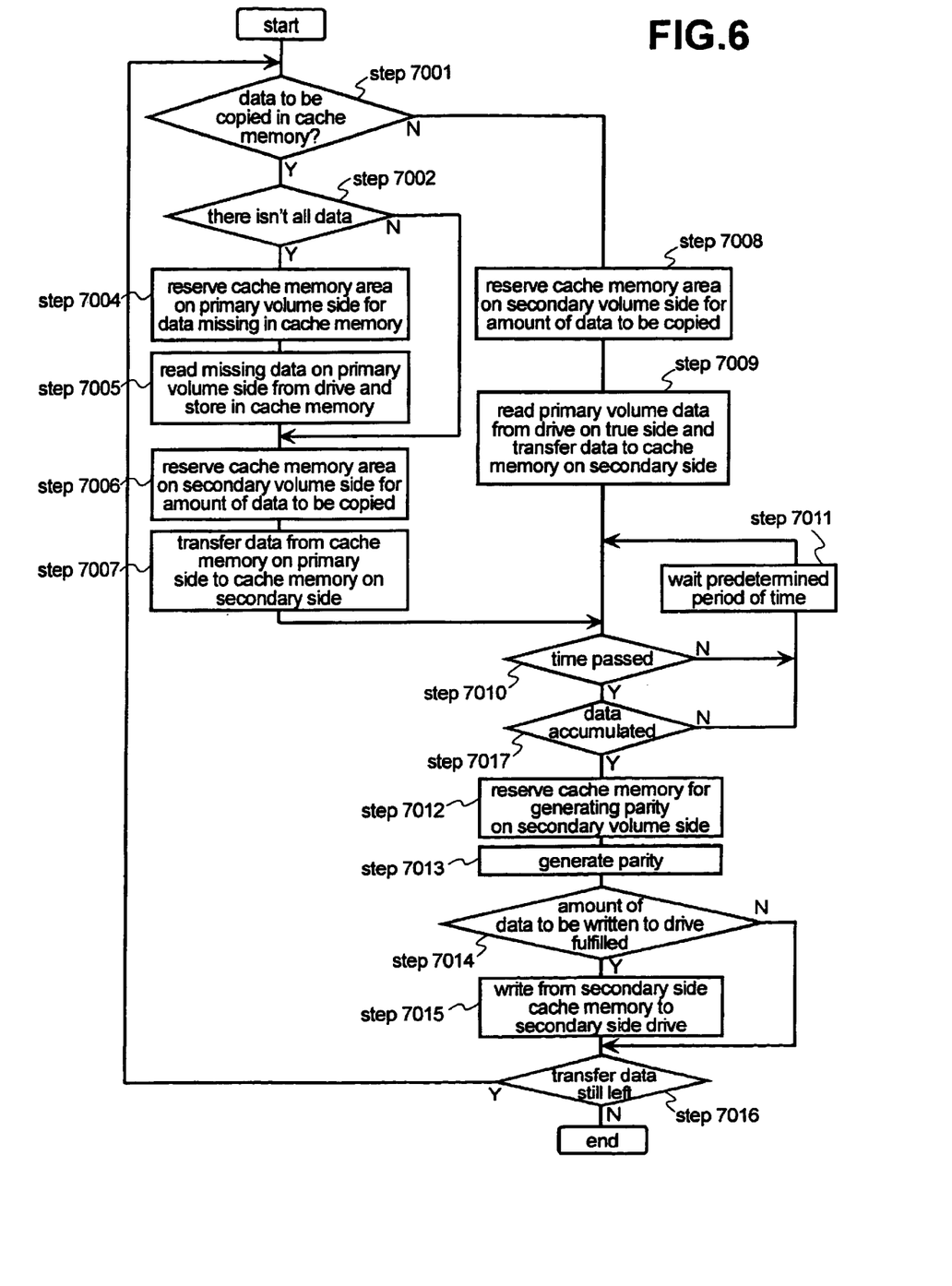
FIG. 6 is a processing flowchart of a snapshot in a cluster.

FIG. 6 is a flowchart which shows a procedure used for creating a target volume in the cluster 11 where the original volume exists. In this case, the one cache memory 16 contained in the cluster 11 is used for the snapshot processing.

Hereafter, the storage capacity of the whole original volume will be indicated as "n" data blocks, and the amount of data to be transferred from the original volume to the target volume in a single process will be indicated as "m" data blocks. Further, the amount of data of one block is typically 512 bytes.

The DKA 14 of the cluster 11 checks to see, among data stored in the primary volume, whether the first m data blocks to be copied exist in the cache memory 16 (step 7001). When any of these data blocks do exist in the cache memory 16, the DKA 14 further checks to determine how many of m data blocks remain in the cache memory 16 (step 7002).

When even one data block of the m data blocks is missing in the cache memory 16, the DKA 14 reserves an area in the cache memory 16 into which to read the rest of the data blocks from the disk unit 15 (step 7004). Then, the DKA 14 reads out the rest of the data blocks from the disk unit 15 into the reserved area in the cache memory 16 (step 7005).

Upon completing the readout of the data block of the primary volume, the DKA reserves a storage area into which the data block is to be copied in the area corresponding to the secondary volume of the cache memory 16 (step 7006). When the storage area is reserved, the DKA 14 transfers m data blocks from the area of the cache memory 16, corresponding to the primary volume, to the area of the cache memory 16 corresponding to the secondary volume. Also, when copying data, identifiers have to be given to the data independently. Since different identifiers are given to data from different volumes, the data is transferred while their identifiers are being converted (step 7007).

On the other hand, when it is determined in step 7002 that all m data blocks are already in the cache memory 16, the DKA carries out steps 7006 and 7007 without any adjustment.

When it is determined that the data blocks to be copied do not exist at all in the cache memory 16 in step 7001, the DKA 14 reserves a storage area, having a size corresponding to the amount of data to be copied to the secondary volume side, namely, a storage area for m data blocks, in an area corresponding to the secondary volume of the cache memory 16 (step 7008).

The DKA 14 then reads m data from the disk unit 15 on the primary volume side, and it transfers the data to an area of the cache memory 16 on the secondary volume side, while converting the identifiers (step 7008).

When the data is stored in the area corresponding to the secondary volume of the cache memory 16, the DKA 14 starts the process of writing data on the disk unit 15 corresponding to the secondary volume. First, the DKA 14 checks to see, at predetermined time intervals, if the amount of data not written into the disk unit 15 in the cache memory 16 exceeds a predetermined boundary value (steps, 7010 and 7017). When the amount of data is less than the boundary value, the DKA 14 checks to determine whether a predetermined time has passed, and it checks again if the amount of data has exceeded the boundary value (step 7011).

When the amount of data is equal to or over the boundary value, in order to generate parity of the data on the secondary volume side, the DKA 14 reserves a storage area of the cache memory 16 for the amount of data corresponding to the parity (step 7012). Then, the DKA 14 carries out generation of parity (step 7013).

The DKA 14 then checks to see if the data stored in the cache memory 16, with its parity generated, is as much as the amount of data of the unit to be written to the disk unit 15 (step 7014). If the predetermined amount of data has been achieved, the DKA 14 writes the data of the cache memory 16 to the disk unit 15 (step 7015). If the predetermined amount of data has not been achieved, the DKA 14 repeats the process of step 7014.

Then, the DKA 14 checks to see if the copied amount of data has reached "n" data blocks (step 7016). If the amount of data has not reached "n" data blocks, the DKA 14 repeats the process of step 7001 and the succeeding steps until the copied amount of data reaches "n" data blocks, and completes the process when the amount of data reaches "n" data blocks. Further, in step 7016, the pair state 26 of the volume pair information 21 and the value of the copy pointer 27 are renewed.

The amount of data "n" is determined optionally. However, in general, it corresponds to the amount of a logical volume provided to the external device by the cluster-structured storage system. In the present embodiment, one cache memory 16 is divided so as to be used on the primary volume side and on the secondary volume side. However, the cache memory 16 may be used without being divided.

Now, the process of performing a snapshot between clusters creating a target volume in a cluster 11, which is different from an original volume, will be described.

Figure 7:
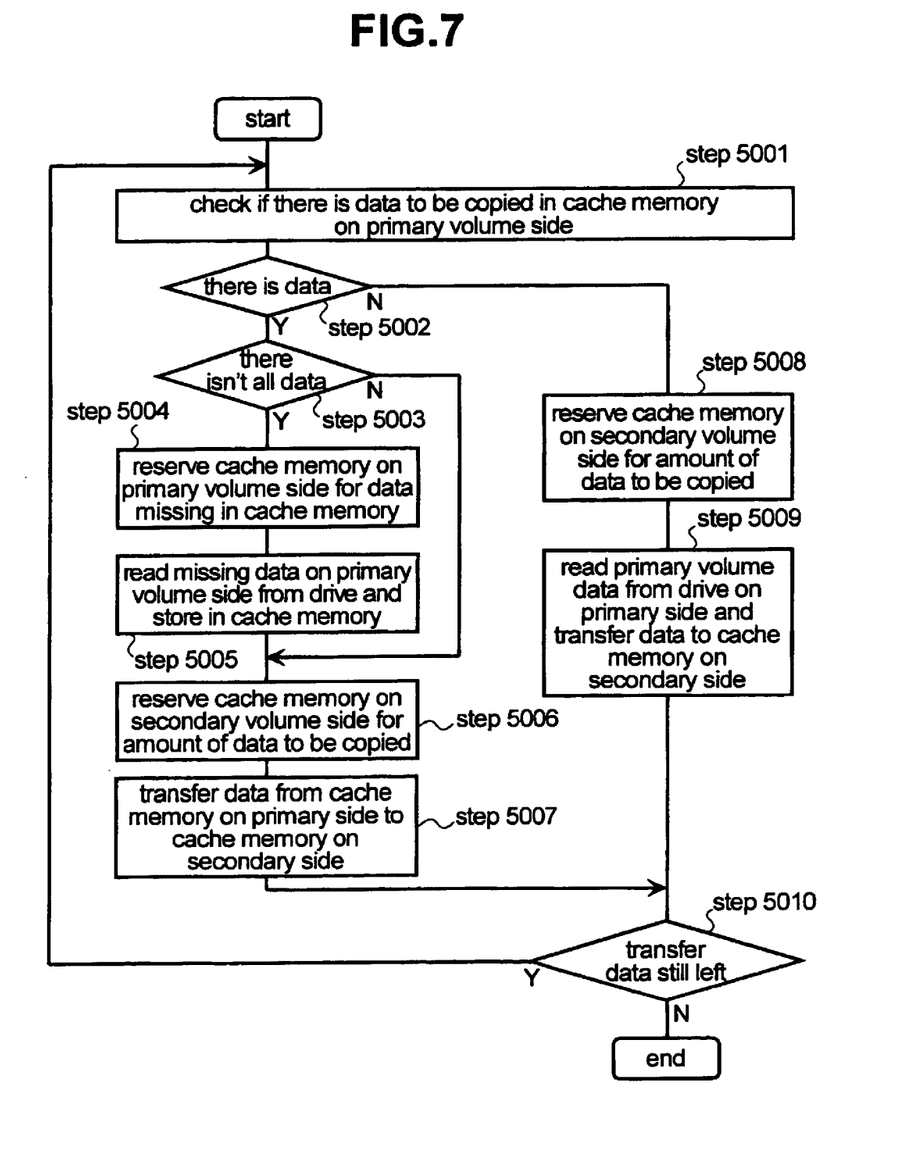
FIG. 7 is a processing flowchart of a true volume cluster of a snapshot between clusters.

FIG. 7 is a flowchart showing steps of processing for the cluster 11 of the primary volume in the snapshot between clusters.

The process from step 5001 to step 5009 is the same as the process from step 7001 to step 7009 that has already been described with reference to FIG. 6. However, the process from step 5006 to step 5009 extends over the cluster 11. In this case, the DKA 14 transfers data via an inter-cluster connecting mechanism 12. Further, the cluster 11 of the primary volume can use, as a cache memory 16 to which data is transferred, either the cache memory 16 contained in the cluster 11 on the primary volume side or the cache memory 16 contained in the cluster 11 on the secondary volume side. The following example will be discussed on the assumption that the cache memory 16 contained in the cluster on the secondary volume side is used.

When the DKA 14 of the cluster 11 of the primary volume reserves a storage area of the cache memory 16 in the cluster 11 of the secondary volume, or transfers data to the cache memory 16 in the cluster 11 of the secondary volume, the DKA 14 of the cluster 11 of the primary volume directly gains access to shared memory 17 in the cluster 11 of the secondary volume via the inter-cluster connecting mechanism 12. Which location to access in the shared memory 17 is determined according to the previously described method and by calculating a virtual address of the shared memory 17 to be accessed.

Upon completing the transfer of m data blocks to the cache memory 16 of the cluster 11 of the secondary volume, the DKA 14 of the cluster 11 of the primary volume checks to see if there is additional data to be transferred (step 5010). If there is, the DKA 14 returns to step 5001 and repeats the transfer. If there isn't, the DKA 14 completes the process.

Figure 8:
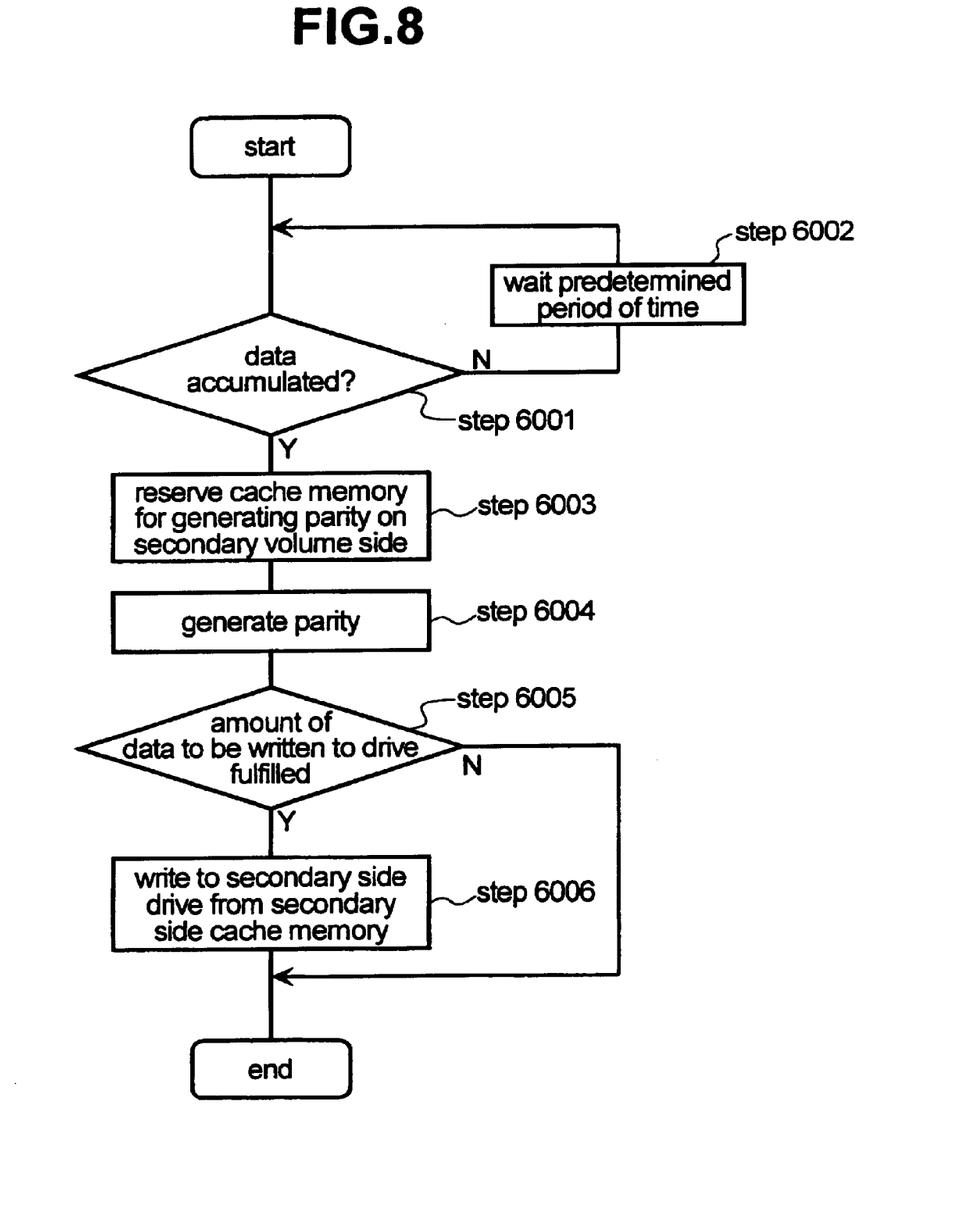
FIG. 8 is a processing flowchart of a sub-volume cluster of a snapshot between clusters.

FIG. 8 is a flowchart of a snapshot carried out in the cluster 11 of the secondary volume.

In the cluster-structured storage system 1, processing between clusters 11 is carried out independently. Therefore, the cluster 11, having a storage area which is to be a secondary volume, cannot determine whether the snapshot has started in the cluster 11 of the primary volume. in particular, whether data has been transferred to its own cache memory 16. Therefore, according to the present embodiment, the DKA 14 of the cluster 11 of the primary volume notifies the DKA 14 of the cluster 11 of the secondary volume of timing for executing the snapshot.

For example, the DKA 14 of the cluster 11 of the primary volume stores a message to start the DKA 14 of the cluster 11 of the secondary volume in an exclusive queue for messages (not shown) provided in the shared memory 17. The DKA 14 of the cluster 11 of the secondary volume periodically checks to see if a message is registered in the exclusive queue for messages. If there is a message, the DKA 14 of the cluster 11 of the secondary volume acquires the message and starts a job corresponding to the snapshot processing.

Upon acknowledging the message from the cluster 11 of the primary volume, the DKA 14 of the cluster 11 of the secondary volume references control information of the cache memory in the shared memory 17 of the cluster 11 and checks to see if data to be copied is accumulated in its own cache memory 16. If the data has not been accumulated, the DKA 14 of the cluster 11 of the secondary volume waits a predetermined period of time, and then checks again (steps 6001 and 6002).

In the case where data is accumulated in the cache memory 16, in order to generate parity corresponding to the data stored in the cache memory 16. the DKA 14 of the cluster 11 of the secondary volume reserves a storage area of the cache memory 16 for the parity (step 6003).

Then, the DKA 14 of the cluster 11 of the secondary volume generates parity for the data stored in the cache memory 16 (step 6004). When data is stored up to a predetermined unit in the cache memory 16, the DKA 14 of the cluster 11 of the secondary volume stores the data in the disk unit 15 (step 6005 and 6006).

In the present embodiment, when the DKA 14 of the cluster 11 gains access to information stored in the shared memory 17 of the other cluster 11, an inter-cluster connecting mechanism 12 is used. However, when the inter-cluster connecting mechanism 12 has a fault or other problem, the DKA 14 of the cluster 11 is able to gain access to the shared memory 17 of the other cluster 11 via the network 2. In that case, it is necessary to define in advance which one of communication paths to the network 2 to use for transfer.

When a snapshot is carried out, the cluster 11 on the primary volume side references a dirty amount of data in the cluster 11 of the secondary volume, and executes the snapshot while watching that the dirty amount does not exceed a threshold value. Among data in the cache memory, "dirty data" is data which is not reflected in the disk unit 15. Also, the term "dirty amount" refers to the total amount of dirty data in all of the cache memory in the cluster.

When executing a snapshot in the cluster-structured storage system 1, first, a user has to select a secondary volume to which data is to be copied. Now, a method to support the selection of a secondary volume in the cluster-structured storage system 1 will be described.

Figure 9:
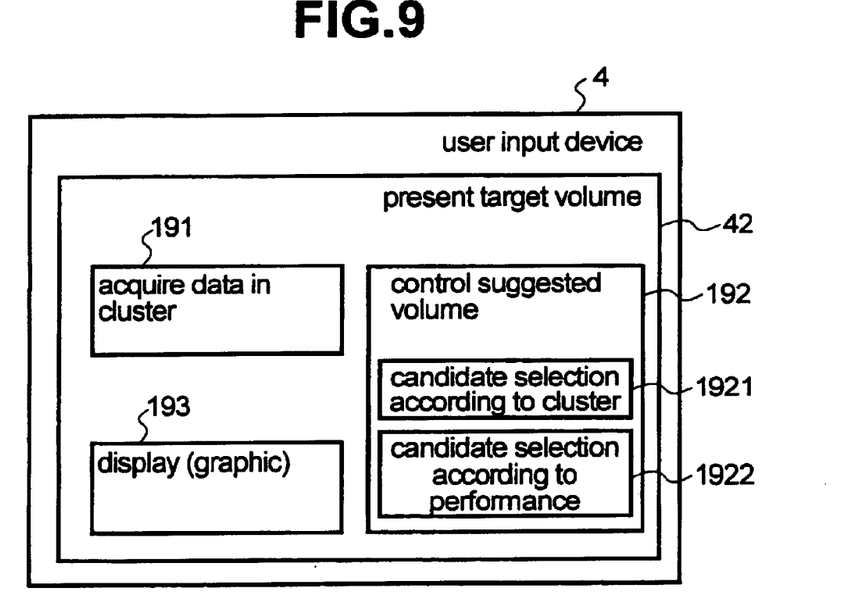
FIG. 9 shows a block diagram of a program structure for suggesting a volume to which data is copied.

The user input device 4 provides the user with information on a volume to which the snapshot is taken by executing a program 42, shown in FIG. 9, for presenting a target volume. The user input device 4 can be a personal computer or a notebook-sized personal computer, for example.

The user input device 4 recognizes the cluster-structured storage system 1 via the network 2. Also, the user input device 4 may be directly connected with each cluster 11 contained in the cluster-structured storage system 1 using a dedicated line. In such a case, an exchange of data between the user and the cluster-structured storage system 1 does not affect the traffic load of the network 2.

As seen in FIG. 9, target volume presenting program 42 comprises a program 191 for acquiring data in the cluster, which acquires constituent information (such as unassigned volume numbers) of each cluster 11 of the cluster-structure storage system 1, a suggested volume control program 192 for selecting a volume to be suggested to the user from the acquired constituent information of the cluster 11 and various conditions (such as a request to select a target volume inside/outside the cluster of the original volume), and a subprogram of a display program 193 for displaying the suggested volume on the display screen 41.

The data acquisition program 191 is executed when acquiring unassigned volume information stored in the target cluster-structured storage system 1. Further, unassigned volume information is acquired from all the clusters 11. Upon acquiring data, an exclusive command is used, and volume state information, which indicates whether the volume stored in the shared memory 17 via the CHA 13 is available, is acquired.

Also, there is another method which may be used to select an unassigned volume in the cluster 11 and give information on the unassigned volume alone to the user input device 4. This method takes some of the load off the user input device 4.

Based on acquired data of the cluster structure, the suggested volume control program 192 is executed to control candidate volumes according to each cluster 11.

The display program 193 is a program to be executed when suggesting a volume to the user visually with a display screen 41.

The user input device 4 accepts an input, such as a change in display mode, from the user via an interface for the user input. With respect to the contents displayed on the display screen 41, when receiving an input from the user, the user input device 4 executes the suggested volume control program 192 to process the input from the user and displays the result again on the display screen 41.

For example, when the user wishes candidates of the secondary volume to be suggested within the same cluster 11, the user inputs a request accordingly. Then, the user input device 4 executes a candidate selection program 1921 according to the cluster in the suggested volume control program 192 to select the candidate volume and displays it on the display screen 41.

Further, when a particular one of the volumes suggested above is selected and copied, the user input device 4 produces information predicting how much the operation is delayed, selects the candidate volume according to such prediction, and displays it on the screen. For example, the user input device 4 acquires, from history monitor information of the cluster-structured storage system 1, the number of I/O operations to and from the volume contained in the cluster-structured storage system 1 over the last one hour (or specified time period) and the amount of data transferred.

Assuming that the cluster-structured storage system 1 is in a state based on the acquired information, the user input device 4 simulates how much load is given in this state when a process to create a copy volume in the volume specified by the user is added to the cluster-structured storage system 1, and how much the I/O is usually delayed. Then, according to the result, the user input device 4 puts candidate volumes in order of priority and communicates this to the user.

Figure 10:
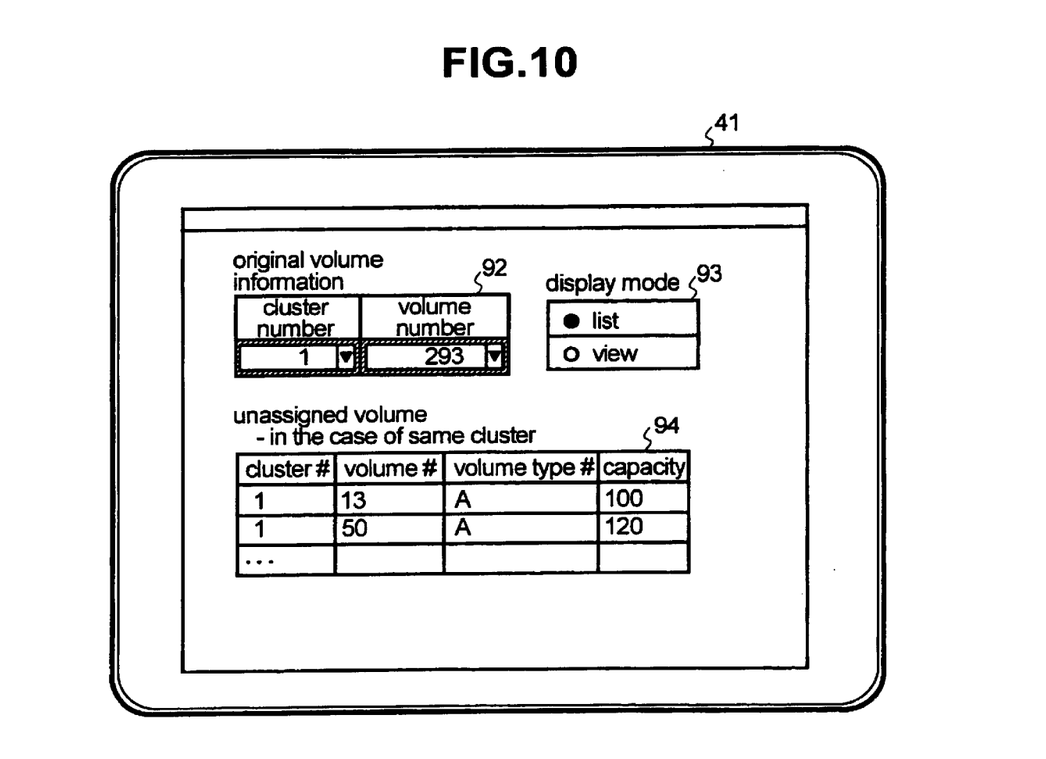
FIG. 10 is a diagram which shows an example of a sub-volume selection-support screen.
Figure 11:
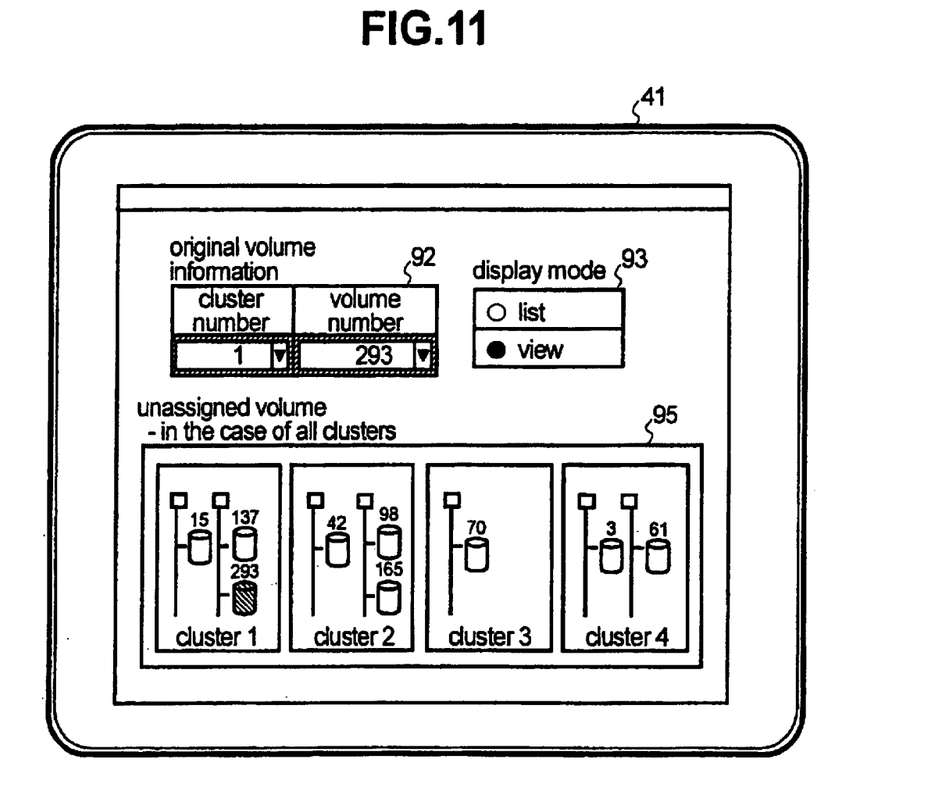
FIG. 11 is a diagram which shows an example of a sub-volume selection-support screen.

FIG. 10 shows an example in which, when input data 92 inputted by the user are a cluster number and a volume number of the original volume, candidates for a target volume are narrowed and displayed on the display screen 41 by the user input device 4 so that the user can easily select the target volume. In FIG. 10, unassigned volume numbers in the cluster 11, where the original volume exists are listed and displayed. According to a display mode 93, the user can select either a list mode (FIG. 10) or a view mode (FIG. 11).

In the display of the view mode (FIG. 11), the physical positional relationship of volumes is displayed diagrammatically according to each cluster 11. Therefore, the user can recognize unassigned volumes, etc. at a glance. Further, in the display of the view mode (FIG. 11), the user can easily decide whether to make a copy in the cluster 11 where the original volume exists, or to make a copy in a different cluster 11.

The user input device 4 may suggest to the user all the volumes which can be candidates of secondary volumes, or it may narrow the candidates of secondary volumes and suggest fewer volumes to the user. Further, the user input device 4 may have a function to select one volume from the previously described candidates of secondary volumes.

When the user wishes to select a use for each cluster and store a volume, it is possible for the user to employ the input device 4 to select a volume according to the decision of the user. For example, when the user wishes to store data of Company A in a cluster 1 and data of Company B in a cluster 2, using the user input device 4, the user enters, in advance, information on a correlation between the clusters and the companies. When the user newly creates a volume, according to a company name specified by the user, the user input device 4 recognizes a proper cluster and suggests an unassigned volume in the cluster.

As an alternative embodiment, it is possible for the user to specify the use of a primary volume in the cluster 1 for storing and the use of a secondary volume in the cluster 2 for storing. In this case, the user can use each cluster for a different purpose, such as the cluster 1 for accepting a normal I/O and the sub-cluster for a test I/O, etc. With this usage, the performance of the normal I/O does not deteriorate. Further, even when a cluster on the test side has a fault, the user can close the cluster without affecting the cluster used for the normal I/O at all. Further, the cluster 2 serves as a backup of the cluster 1. Thus, by making a backup in another cluster, the availability of the system as a whole is enhanced.

Further, when a particular cluster is operating under heavy load conditions, the user input device 4 may suggest that the user select a secondary volume in a different cluster so that the load is distributed all over the cluster-structured storage system 1.

According to the present invention, without any concern for the clusters, the user can copy data by use of a snapshot function to any volume of any cluster in the cluster-structured storage system. Thus, the scalability of the cluster-structured storage system is enhanced.

The present invention has been described in terms of preferred embodiments. However, those skilled, in the art will recognize that many variations of sub-embodiments exist. Such variations are intended to be within the scope of the present invention and the appended claims.

What is claimed is:

1. A computer system, comprising:
   a cluster-structured storage system having a plurality of storage systems; and
   a computer connected to said cluster-structured storage system,
   wherein each of said plurality of storage systems includes a memory in which information on a storage area contained in the storage system is stored,
   wherein a first storage system of said plurality of storage systems operating to acquire information in the memory contained in a second storage system of said plurality of storage systems based on an instruction of said computer and to transfer data from a storage area contained in the first storage system to a storage area contained in said second storage system based on said acquired information,
   wherein said first storage system and said second storage system are connected via an inter-cluster connecting mechanism directly,
   wherein said first storage system acquires said acquired information from said second storage system via said inter-cluster connecting mechanism, and
   wherein said first storage system sends data to said second storage system via said inter-cluster connecting mechanism.

2. A computer system according to claim 1, wherein the memory contained in each of said plurality of storage systems is mapped in one virtual memory space.

3. A computer system according to claim 2, wherein said computer has a display screen, and, when copying a volume in said first storage system, the computer displays a volume contained in said second storage system, as a candidate to which data is to be copied, on said display screen.

4. A computer system according to claim 2, wherein said computer has a display screen, and, when copying a volume in said first storage system, said computer displays a volume contained in said first storage system, as a candidate to which data is to be copied, on said display screen.

5. A computer system according to claim 2, wherein said second storage system has a plurality of disk drives and a controller,
   wherein said controller stores said data sent by said first storage system into the memory of said second storage system, and
   wherein said controller moves said data stored in the memory into said plurality of disk drives after receiving an instruction from the first storage system via said inter-cluster connecting mechanism.

6. A computer system according to claim 1, wherein said first storage system and said second storage system are connectable via network, and when said inter-cluster connecting mechanism breaks down, said first storage system transfers data to said second storage system via said network instead of said inter-cluster connecting mechanism.

7. A cluster-structured storage system, comprising:
   means for connecting the system with a computer;
   a plurality of storage systems; and
   an inter-cluster connecting mechanism which interconnects said plurality of storage systems,
   wherein each of said plurality of storage systems includes a memory in which information on a storage area contained in the storage system is stored,
   wherein a first storage system of said plurality of storage systems operating to acquire information in the memory contained in a system storage system of said plurality of storage systems and to transfer data from a storage area contained in said first storage system to a storage area contained in said second storage system based on said acquired information,
   wherein said first storage system acquires said acquired information from said second storage system via said inter-cluster connecting mechanism, and
   wherein said first storage system sends data to said second storage system via said inter-cluster connecting mechanism.

8. A cluster-structured storage system according to claim 7, wherein said first storage system and said second storage are connectable via network, and when said inter-cluster connecting mechanism breaks down, said first storage system transfers data to said second storage system via said network instead of said inter-cluster connecting mechanism.

9. A cluster-structured storage system according to claim 7, wherein said second storage system has a plurality of disk drives and a controller,
   wherein said controller stores said data sent by said first storage system into the memory of said second storage system, and
   wherein said controller moves said data stored in the memory into said plurality of disk drives after receiving an instruction from the first storage system via said inter-cluster connecting mechanism.

10. A method of data replication in a computer system including a cluster-structured storage system having a plurality of storage systems and a computer connected to said cluster-structured storage system, said method comprising the steps of:
    storing, in a memory in each of said plurality of storage systems, information on a storage area contained in the respective storage system;
    acquiring information in the memory contained in a second storage system of said plurality of storage systems by using a first storage system of said plurality of storage systems based on an instruction of said computer; and
    transferring data from a storage 6ata-area contained in said first storage system to a storage area contained in said second storage system based on said acquired information by using said first storage system.

* * * * *